May 24, 1932. G. WALLSTAB 1,859,854
HEADLIGHT FOR MOTOR VEHICLES
Filed Oct. 30, 1931
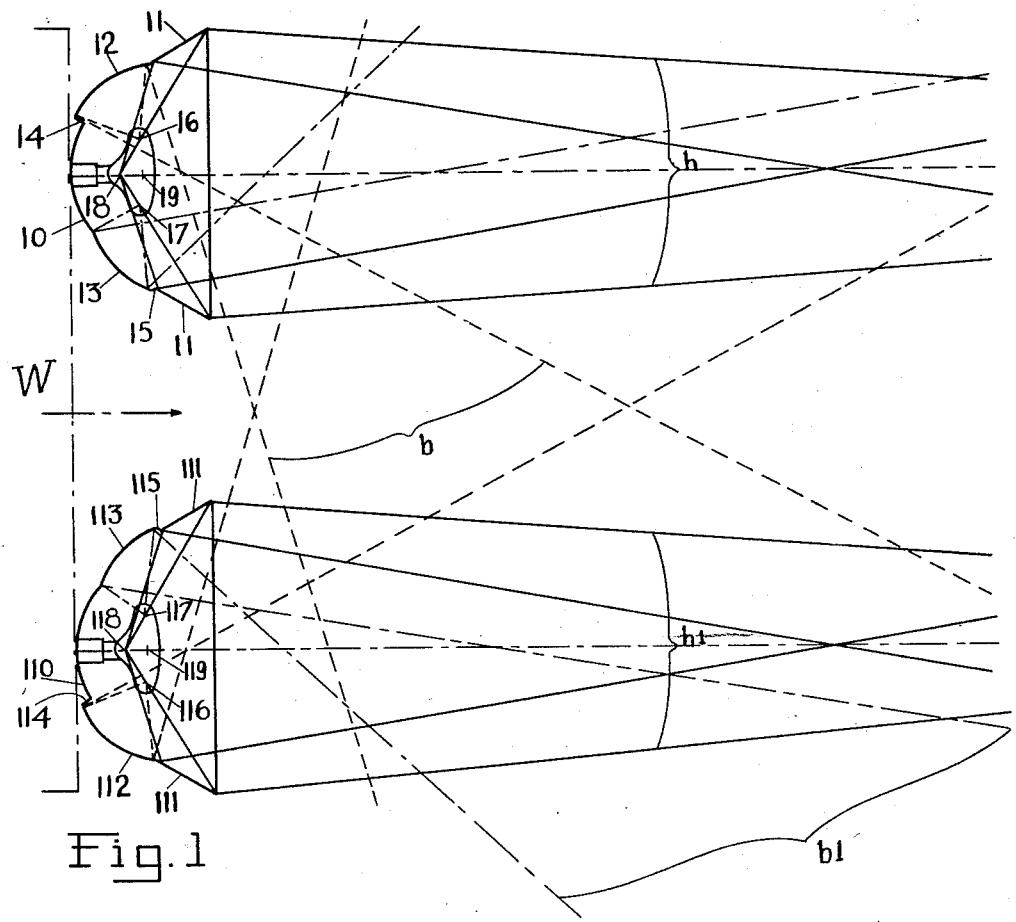
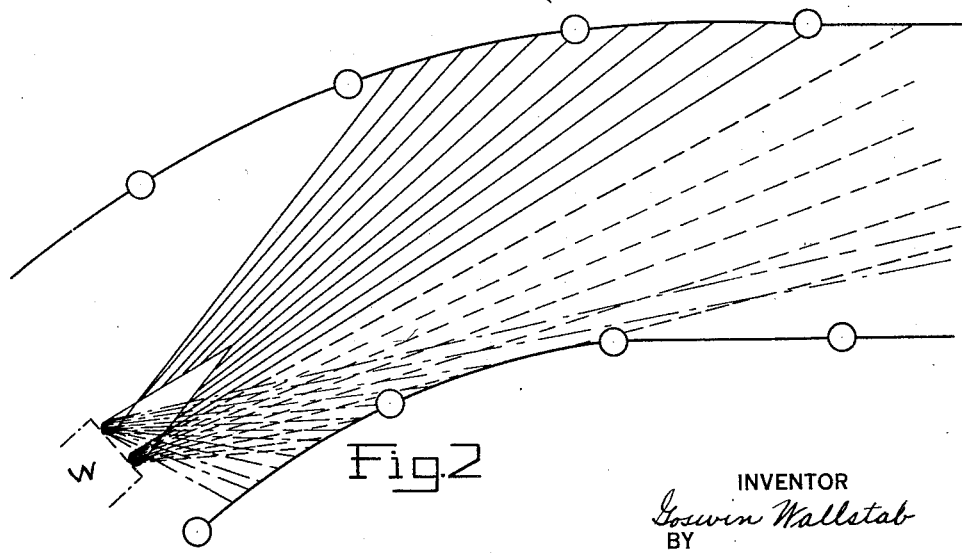
INVENTOR
Goswin Wallstab
BY
Watson, Bristol, Johnson & Leavenworth
ATTORNEYS Patented May 24, 1932

1,859,854

UNITED STATES PATENT OFFICE

GOSWIN WALLSTAB, OF BERLIN, GERMANY

HEADLIGHT FOR MOTOR VEHICLES

Application filed October 30, 1931, Serial No. 572,009, and in Germany October 25, 1930.

This invention relates to head lights for motor vehicles and more especially to a type of head light which is adapted to provide improved illumination of curves in the roadway.

An object of the invention is to provide an improved head light arrangement of the general type wherein auxiliary reflecting mirrors are utilized.

A more specific object of the invention is to provide a head light arrangement wherein a parabolic reflector is provided with auxiliary reflecting mirrors, and a plurality of light sources, the configuration and position of the mirrors and of the light sources with respect thereto being such that improved illuminating characteristics are obtained.

Other objects of the invention will in part be obvious and will in part appear hereinafter.

The invention accordingly comprises the features of construction, combination of elements, and arrangement of parts, which will be exemplified in the construction hereinafter set forth and the scope of the application of which will be indicated in the claims.

For a fuller understanding of the nature and objects of the invention reference should be had to the following detailed description taken in connection with the accompanying drawings, in which:

Fig. 1 is a diagrammatic representation of a pair of motor vehicle head lights embodying features of the invention, the representation indicating the surface contour of the interior or reflecting face of the head lights in a central horizontal plane therethrough; and Fig. 2 is a somewhat diagrammatic representation of the action of the present head lights in illuminating a curved portion of the roadway.

Referring more particularly to the drawings, there are shown two head lights respectively provided with reflectors 10 and 110. These head lights are horizontally spaced in the conventional manner on a motor vehicle indicated at W, which moves in the direction indicated by the arrow. The corresponding reflectors 10 and 110 are in the general form of a paraboloid, portions of the parabolic surfaces thereof being indicated at 11 and 111. The left-hand reflector 10 is provided in its left, or outward, lateral wall with a spherical concave mirror 12, and in its opposite, or right, lateral wall has an additional spherical concave mirror 13. Mirror 12 has a greater degree of curvature than mirror 13. These mirrors are so positioned that the angle between the principal axis of mirror 12 and the principal axis of the parabolic reflector is acute and is greater than the similar acute angle formed between the principal axis of mirror 13 and the reflector axis. Right-hand reflector 110 is provided with corresponding spherical concave mirrors 112 and 113, which respectively are located in the right, or outer, and left, or inner, lateral surfaces of the reflector, the two corresponding head lights being disposed with their corresponding elements symmetrically located with respect to the longitudinal axis of the vehicle. Because of the variations in the angles through which mirrors 12 and 13, and 112 and 113, are tilted with respect to their corresponding reflector axes, a particular shape is imparted to such auxiliary mirrors in that they meet or merge on one side with the parabolic reflector surface, while on the other side they project to a greater or less degree therefrom, and are connected with such surfaces by means of cylindrical surfaces indicated at 14, 15, 114 and 115. Preferably, several individual light sources are provided for the various reflectors. Thus lateral sources of light 16 and 116 act on the more sharply curved concave mirrors 12 and 112, the location of the light sources and the direction of the principal axes of the mirrors being so related that a relatively wide light bundle or light beam $b$ is directed toward the side of the road. The less sharply curved mirrors 13 and 113 respectively are provided with light sources 17 and 117, rays from which are reflected in a relatively concentrated light bundle or beam $b1$. The relationship between the location of light sources 17 and 117 and the tilting of the principal axes of their cooperating mirrors 13 and 113, are such that the forward portion of light beam $b1$ is directed laterally toward a relatively advanced portion of the roadway. The light bundles or beams which project forwardly in the conventional manner are respectively designated h and h1, and preferably originate from additional individual light sources which will be hereinafter described.

It will be seen that the arrangement of the head lights is such that the sharply curved mirror 12 in the left side of the left reflector 10 is adapted to cast a wide beam to the right-hand side of the road at points which are relatively near to the motor vehicle, so that the roadway will be illuminated even when extremely abrupt right-hand turns are encountered. At the same time, the mirror 113 of the right-hand reflector 110 directs a relatively somewhat stronger or more concentrated beam of light toward the right side of the road, illuminating a more advanced portion thereof and assuring visibility in the case of less abrupt right turns in the roadway. It will be apparent that mirrors 13 and 112, similarly cooperate to throw a wide combined beam of light toward the left side of the road. The two light sources 16 and 117, which, as described, cooperate to illuminate the right-hand roadside, lie in the same electrical circuit, which circuit preferably has a separate control switch, and are screened off so that rays emanating therefrom strike only their respective cooperating concave mirrors. In a similar fashion, the light sources 17 and 116 are mutually inserted in a single, preferably separately controllable, circuit.

The sources of light for each head light, in the preferred form, all are contained in a single bulb of an incandescent lamp having four filaments, such bulb having a more or less conventional exterior form, with a flattened top. In the incandescent lamp of light 10, in addition to the above described laterally disposed light sources, is a filament 18 positioned at or near the focus of paraboloid 11, in order to provide for distant illumination. This bulb further contains a relatively forwardly disposed filament 19 which is screened off on its under-side and is adapted to provide for nearby illumination, by reflection from the upper reflecting surface of paraboloid 11. All four sources of light lie in a horizontal cross-section which goes through the focus and the vertex of the paraboloid 11. Furthermore, this cross-section contains the principal axes of the spherical concave mirrors 12 and 13. The right head light 110 is provided with a similar incandescent lamp having four filaments comprising, in addition to the already described light sources or filaments 116 and 117, other filaments 118 and 119 corresponding to and performing the same functions as the above described filaments 18 and 19.

Fig. 2 of the accompanying drawings show the action of the herein described head lights when the vehicle is rounding a right curve. The unbroken rays represent the distant illumination. As clearly appears, these forwardly directed rays serve only to illuminate the far side of the curving roadway, and leave the right-hand portion thereof, into which the vehicle is advancing, substantially invisible, a feature which is characteristic of many types of unimproved head lights at present in common use. The broken lines in Fig. 2 represent the curve illumination in the case of a right curve, as obtained by means of mirrors 12 and 113 and their respective light sources. As the diagram shows, a particularly intense illumination is obtained down the middle of the curving road in the direction in which the two bundles or beams of rays b and b1 intersect.

It will be seen that there has been provided a head light arrangement having improved characteristics, which is admirably suited to fulfill its intended functions. Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent, is:

1. In combination, a pair of forwardly directed laterally spaced right and left motor vehicle head lights which are adapted to illuminate the sides of curved roads, each head light having a main reflector generally in the form of a paraboloid, a light source located in the principal axis of each of said main reflectors, the left main reflector having an auxiliary concave spherical reflector of relatively short radius of curvature located in its left side wall, and having a second auxiliary concave spherical reflector of longer radius of curvature as compared with said first named spherical reflector located in its right side wall, said first named spherical reflector having its principal axis directed to the right and forming an acute angle with respect to the principal axis of the left main reflector, and said second spherical reflector having its principal axis directed to the left and forming a comparatively smaller acute angle with respect to the principal axis of the left main reflector, an auxiliary light source for said first named spherical reflector located to the left of the principal axis of said left main reflector in position to cause its short radius spherical reflector to reflect a relatively diffuse beam of light to the right and close to the vehicle, an auxiliary light source for said second spherical reflector located to the right of the principal axis of said left main reflector in position to cause its longer radius spherical reflector to reflect a more concentrated beam of light to the left and relatively in advance of the vehicle; the right main reflector having on its right side an auxiliary short radius spherical reflector and auxiliary light source corresponding to those in the left side of the left main reflector, and also having on its left side an auxiliary longer radius spherical reflector and auxiliary light source corresponding to those in the right side of said left main reflector, whereby the short radius auxiliary reflector of one headlight and the longer radius auxiliary reflector of the other headlight reflect mutually intersecting light bundles which illuminate the roadway closely in front of and to the side of the vehicle as well as further ahead.

2. In combination, a pair of forwardly directed laterally spaced right and left motor vehicle headlights which are adapted to illuminate the sides of curved roads, each headlight having a main reflector generally in the form of a paraboloid, a light source located in the principal axis of each of said main reflectors to provide for distant illumination, the left side wall of the left main reflector and the right side wall of the right main reflector each having formed therein an auxiliary concave spherical reflector having a sharp degree of curvature, the principal axes of said auxiliary reflectors respectively forming a relatively large acute angle with the principal axes of their respective main reflectors, the right side wall of the left main reflector and the left side wall of the right main reflector also each having formed therein an auxiliary concave spherical reflector having a less sharp degree of curvature than said first named spherical reflectors, the principal axes of said second named auxiliary reflectors respectively forming a relatively smaller acute angle with the principal axes of their respective main reflectors so that said second named auxiliary reflectors are directed laterally of the vehicle but further forwardly thereof than are said first named sharply curved auxiliary reflectors, a light source for each of said sharply curved auxiliary reflectors so located in front of its respective reflector as to cause it to reflect a relatively diffuse beam of light toward the side of the road close to the vehicle, a light source for each of said less sharply curved auxiliary reflectors so located in front of its respective reflector as to cause it to reflect a relatively concentrated beam of light toward the side of the road further ahead of the vehicle, whereby the sharply curved laterally directed auxiliary reflector of the left headlight and the less sharply curved laterally and forwardly directed auxiliary reflector of the right headlight cast intersecting light bundles toward the right side of the vehicle which illuminate the roadway closely in front of the vehicle as well as further ahead, and whereby the remaining auxiliary reflectors similarly illuminate the left side of the roadway.

In testimony whereof I affix my signature.

GOSWIN WALLSTAB.